United States Patent
Kuckes et al.

(10) Patent No.: US 6,466,020 B2
(45) Date of Patent: Oct. 15, 2002

(54) ELECTROMAGNETIC BOREHOLE SURVEYING METHOD

(75) Inventors: Arthur F. Kuckes, Ithaca, NY (US); Rahn Pitzer, Ithaca, NY (US); Herbert J. Susmann, Ithaca, NY (US)

(73) Assignee: Vector Magnetics, LLC, Ithaca, NY (US)

( * ) Notice: Subject to any disclaimer, the term of this patent is extended or adjusted under 35 U.S.C. 154(b) by 0 days.

(21) Appl. No.: 09/810,426

(22) Filed: Mar. 19, 2001

(65) Prior Publication Data

US 2002/0130663 A1 Sep. 19, 2002

(51) Int. Cl.[7] .................. E21B 47/022; E21B 47/09; E21B 47/12
(52) U.S. Cl. .................. 324/326; 324/346; 175/45
(58) Field of Search .................. 175/10, 45, 220; 324/326, 346, 348, 351, 352, 370

(56) References Cited

U.S. PATENT DOCUMENTS

| | | |
|---|---|---|
| 736,432 A | 8/1903 | Owens |
| 3,529,682 A | 9/1970 | Coyne et al. |
| 3,589,454 A | 6/1971 | Coyne |
| 3,712,391 A | 1/1973 | Coyne |
| 3,853,185 A | 12/1974 | Dahl |
| 3,907,045 A | 9/1975 | Dahl |
| 4,402,372 A | 9/1983 | Cherrington |
| 4,710,708 A | 12/1987 | Rorden |
| 4,875,014 A | 10/1989 | Roberts |
| 5,305,212 A * | 4/1994 | Kuckes .................. 364/422 |
| 5,320,180 A | 6/1994 | Ruley |
| 5,513,710 A * | 5/1996 | Kuckes .................. 175/45 |
| 5,515,931 A | 5/1996 | Kuckes |
| 5,589,775 A | 12/1996 | Kuckes |
| 5,725,059 A * | 3/1998 | Kuckes et al. .................. 175/45 |
| RE36,569 E * | 2/2000 | Kuckes .................. 324/346 |
| 6,107,801 A * | 8/2000 | Hopwood et al. .......... 324/326 |

OTHER PUBLICATIONS

Telford, W.M.; Geldart, L.P.; Sheriff, R.E.; Keys, D.A. "Magnetic Methods," Applied Geophysics, Cambridge University Press (England), p. 144–147.

Pratt, C.K.; Hartmann, R.A., "A Magnetostatic Well Tracking Technique for Drilling of Horizontal Parallal Wells," SPE 69th Annual Conference, Society of Petroleum Engineers, p. 277–290, (Sep. 15, 1994).

* cited by examiner

*Primary Examiner*—Edward Lefkowitz
*Assistant Examiner*—Darrell Kinder
(74) *Attorney, Agent, or Firm*—Jones, Tullar & Cooper, P.C.

(57) ABSTRACT

An apparatus and method for surveying the path of a borehole includes two single-axis field sensors located at a radius centered at a fixed location. Guide wires are located along the earth's surface above the prescribed borehole path and the known electromagnetic field produced by current in the guide wires are detected by the sensors. Values of X and Y vectors at multiple locations on a spherical surface at the radial distance of the sensors are calculated and compared with measured values to define the location of the sensors on the spherical surface to permit the lateral spacing between the sensors and the desired borehole path to be determined.

32 Claims, 7 Drawing Sheets

CONTOURS OF CONSTANT $H_x$ & $H_y$
ON AN XY PLANE PERPENDICULAR TO
A PAIR OF WIRES CARRYING
OPPOSITELY DIRECTED CURRENTS
INTO AND OUT OF PAGE

FIG. 9

ELECTROMAGNETIC BOREHOLE SURVEYING METHOD

BACKGROUND OF THE INVENTION

The present invention relates, in general, to a method and apparatus for surveying generally horizontal boreholes below the earth's surface, and more particularly to a system for detecting and precisely locating a drill head in a borehole with respect to a known location, for use in guiding the drilling of the borehole to a specified location.

Horizontal directional drilling techniques are well known, and have long been used to drill boreholes which cross under areas where trenching is not permitted or is impractical. For example, such techniques are used to drill boreholes under manmade or natural obstacles, such as bodies of water, rivers or lakes, and under highways, airport runways, housing developments, or the like. These boreholes may be used, for example, to position pipelines, underground transmission lines, communications lines such as optical fibers, and other utilities, and often must be drilled within defined areas, must travel long distances, and must exit the ground at predetermined locations.

Conventional directional drilling techniques used to drill such boreholes commonly use a steering tool which measures the borehole inclination, azimuth and tool roll angle at each station where measurements are made. The borehole coordinates are computed and tabulated from these steering tool data as a function of the measured distance along the borehole, which may be referred to as the measured depth of the steering tool. These borehole coordinates suffer from serious cumulative effects caused by the inclination and azimuth determinations made at regularly spaced stations along the borehole, and the lateral errors generated by such conventional borehole surveying are intolerable. The inherent imprecision of this integration is the reason for turning to electromagnetic methods for directly determining drill bit location. However, determination of the radial away distance from the entry point to the drill bit is quite precise since a borehole normally changes direction slowly and modestly in both inclination and azimuth along its length. Thus, if a borehole has been following a curved borehole proposal design path, and has not deviated by more than 3 degrees in direction from the design path direction for 500 meters of drilling, the lateral error with respect to that design proposal could be 25 meters, whereas the radial away error would be less than 1 meter. Accordingly, the present invention incorporates the inherent precision of the radial away distance and the use of electromagnetic processes for determining lateral position in order to precisely locate a drill bit.

important aspect of drilling boreholes for pipeline and cable burial projects is the requirement that the borehole exit at the Earth's surface at a precisely determined location. In order to do this, the driller not only must have a direct determination of lateral position, but also needs reaffirmation of the precise radial distance to the exit location at a distance from that exit point so that appropriate adjustments to the inclination of drilling can be made. Even if the radial distance to the exit location from the entry point of the borehole into the Earth is precisely known and the radial distance of the drill bit from its entry point into the Earth is precisely known, safety considerations alone give high priority to directly determining the relative location of the desired borehole exit point with respect to the drill bit location as the exit point is approached. This invention discloses improved methods of guiding the drilling to the required exit location.

A further important concern in drilling is responding to a sudden and unexpected deflection of the borehole by up to several degrees due to hitting boulders or other obstacles. Immediate correction of such a drilling direction perturbation can be more important than immediate correction of a displacement error since such direction perturbations can lead to a tortuous borehole, which is a very serious defect particularly when attempting to pull a pipeline through the completed borehole. Steering tool inclinometers provide good inclination measurements, usually to a precision of 0.1 or 0.2 degrees; thus good control exists in inclination. However, the standard steering tool azimuthal direction determination provided by the Earth Field magnetometers is inadequate. In addition to being intrinsically much less precise than the inclinometers because of steel in the drill string, motor and drill bit, they are also subject to sudden environmental changes from steel and magnetized objects in the vicinity of the borehole and by nearby auto, truck, train, and ship traffic. This invention provides a much needed method and an apparatus for measuring drilling direction perturbations.

A variety of attempts to improve the accuracy of underground drilling have been made. One such attempt included the use of grids on the earth's surface to guide the drill head, but if access to the surface is not available along the length of the borehole, this technique can encounter serious problems. For example, electrical current-carrying surface grids may be placed on both sides of a river, but since such grids have a limited range, they may not be effective if the borehole drifts away from its planned path as it travels from one grid to the other. Other attempts have included the use of two-loop antenna systems for generating two fields with different frequencies, which are measured by magnetometers mounted within the drill head. Still other attempts to provide improved drill guidance include the use of an externally generated magnetic field produced by one or more current loops made up of straight line segments, wherein the fields are measured by a probe at the drill, the probe having three orthogonal magnetometers which measure X, Y and Z components of the magnetic field. Three accelerometers measure the rotation of the probe with respect to gravity, and this data is used to determine the magnetic field vector at the magnetometers. A theoretical magnetic field vector is then calculated and compared to the measured vector to determine the location of the probe.

Although some of these prior systems have been adequate for many applications, they have not been totally satisfactory, and there exists a need for an improved borehole surveying method which will permit accurate and reliable location of drill heads for drill heads to enable boreholes to be drilled along preselected paths to distant locations.

SUMMARY OF THE INVENTION

In accordance with preferred embodiments of the invention, improved methods for precisely surveying the path of a borehole in the Earth are provided. These methods are not only used to locate a drill head and its steering tool in a borehole in order to provide data for guiding the drilling of the borehole along a prescribed path, for example to an exit point at a remote location, but may also be used for other purposes such as surveying existing boreholes.

The method of the present invention is based on the use of a detector which may be adapted from, or which may be similar to, those which are found in conventional steering tools for drill assemblies. In a preferred form of the invention, the detector incorporates two single-axis electromagnetic field sensors which preferably are perpendicular to each other and to the axis of the steering tool, and lie on an imaginary "patch", or segment on the surface of a sphere. The sensors are approximately perpendicular to the radius of this spherical segment, with the radius being centered at a fixed location from which measurements are to be made; for example, at the entry point of a borehole being drilled into the Earth. One or more guide wires are located on the Earth's surface near the borehole entry point and/or the borehole exit point, and extend along the surface above the prescribed borehole path. An electromagnetic field is generated in the Earth in the region of the prescribed path by a known electric current flowing through the guide wires. Values of x and y vectors of this electromagnetic field at multiple locations on a spherical surface at the radial distance where the sensors are known to lie are calculated, and the x and y vectors at that location are measured by the two sensors. The location on that spherical surface where the calculated magnetic field values equal the measured magnetic field values defines the location on the patch where the sensors lie, and permits determination of the lateral spacing between the sensors and the desired path of the borehole.

An example of the use of the foregoing method is in the guidance of a conventional drill assembly, including a drill bit carried by a drill stem, to drill a borehole from an entry point at a near side of an obstacle, such as a river, under that obstacle to an exit, or punch-out, location at the far side of the obstacle. The drill assembly includes a drill stem having a conventional steering tool which carries two single-axis electromagnetic sensors which are perpendicular to the steering tool axis. Drilling apparatus at the entry point includes conventional guidance equipment for receiving data signals from the steering tool and for providing suitable control signals for regulating the direction of drilling. One or more guide wires, such as electrical current-carrying source loops, are positioned on the Earth's surface along the proposed path of the borehole to produce corresponding electromagnetic fields along that path. A first loop may be located on the near side of an obstacle, with a part of this loop being located near the entry point, and a second loop may be located on the far side of the obstacle, with a part of the second loop being located near the punchout point. The locations of these loops are known, since their coordinates are determined by conventional land surveys. The first loop is used to guide the drilling at the near side of the obstacle, and the second loop guides the drilling at the far side, with drilling under the obstacle, where the electromagnetic fields from the surface loops are not available, being guided using conventional survey guidance techniques. A pair of loops may be provided at the far side, in another embodiment of the invention.

The borehole entry point preferably is used as the fixed location from which is determined the radius of the surface segment of the sphere, or patch, on which the sensors lie. This radius is the straight line distance, or a vector, between the sensor patch and the entry point, and is very close to the radius determined from integration of the standard steering tool measurements of inclination from the Earth's gravity and azimuth from the Earth's magnetic field along the borehole to the measured depth of the sensors. In many cases, when the borehole is almost straight, this radius is effectively equal to the measured depth of the sensors. The imaginary spherical patch is perpendicular to the radius which is centered at the entry point, and is usually almost perpendicular to the axis of the steering tool which carries the sensors. This radial distance may be referred to as the "away distance" of the sensors. Where this away distance is large, the patch on the spherical surface where the sensors are located is effectively planar.

The method of the invention, in which measured x and y components of a magnetic field are used in conjunction with a radial distance measurement to locate a bore hole with respect to a planned path may be carried out using a variety of guide wire configurations. For example, an electromagnetic field source loop having arbitrary, but known configuration coordinates with respect to the borehole entry point into the Earth generates a calculable magnetic field at any point on a spherical patch on which the sensors lie. A single measurement by each of the two field sensors at a single measuring site at a known radius will then be sufficient to determine the location of the sensors by comparing the measured values to the calculated values, and this will provide sufficient information to provide directional control of the drill.

Where the relative coordinates of a source guide wire loop with respect to a distant reference point, such as the punch-out location discussed above, are known, but the exact distance to that punch-out location from the fixed location of the center of the sphere; i.e., the entry point, is not known, then additional information is needed to determine the drilling direction to the punch out location. Two embodiments of the invention are available for providing this additional information and for determining the distance between the two points.

In the first embodiment, the surface loop near the punch out location is configured so that the current flow in the loop produces a rapidly changing electromagnetic field at some region along the path of the borehole; for example, as the borehole approaches an edge of the surface loop. Two sets of measurements are made by the two sensors, one set at each of two closely spaced measuring sites, or depths, in the borehole in the region where the electromagnetic field is rapidly changing. This results in four field measurements taken at the two measured depths, or away distances, in the borehole. These are compared and matched to theoretical field values which are computed for spherical segments at the two depths. Over the short borehole depth interval between the two sets of measurements, the relative lateral locations of the sensors with respect to the surface loop can be determined by a straight line projection of the borehole. As a result, the radial distance between the sensors and the planned punch-out location of the borehole, in addition to the lateral location of the borehole, can be determined from the change in electromagnetic field components between the two sites.

The second embodiment of the method of the present invention utilizes two electromagnetic field source loops, near the punch-out location, which are independently excited and which are configured to produce a rapidly changing electromagnetic field at neighboring regions or locations in the borehole. Two sets of measurements are made by the two electromagnetic field sensors at a single borehole site for fields generated by each of the loops. These four field measurements are matched to four computed values for that site to obtain the radial distance to the proposed punch-out location in addition to the lateral location information for the drill with respect to the planned path of the borehole.

For a guide wire drilling method, such as the one disclosed herein, the electromagnetic field vector at the borehole is usually dominantly perpendicular to the borehole over most of its length. If the radial location of the electromagnetic field sensors from the borehole entry point into the Earth is already known, the measurement and matching all three orthogonal (x,y, and z) vector components of the electromagnetic field at field sensors in the borehole to computed values to determine borehole location is basically bad, for the axial (z) component of the field at the drill bit has more to do with the orientation of the borehole than its location. The difference between field vector components measured by x and y sensors perpendicular to the borehole and the true components which are approximately perpendicular to the borehole is small, for a 5 degree error in borehole direction results in only a 0.4% error in the measurements while a 9.0% error is generated in the axial component. Thus, the dominant effect of adding a measurement of the $3^{rd}$ component, i.e., the axial component, to the field matching procedure while determining lateral location is the introduction of error.

The z, or axial component measurement can, however, be used to provide vital azimuthal drilling correction information. To the extent that the total electromagnetic field vector is dominantly perpendicular to the borehole, the axial vector is proportional to the sine of the non-perpendicularity of the field and the borehole, i.e., the axial vector is dominated by the borehole orientation rather than its location. Modeling the axial component of the electromagnetic signal together with the inclination determination provided by steering tool measurements can provide the information needed to make an azimuthal determination of borehole direction.

BRIEF DESCRIPTION OF THE DRAWINGS

The foregoing, and additional objects, features and advantages of the present invention will become apparent to those of skill in the art from the following detailed description of preferred embodiments thereof, taken with the accompanying drawings in which.

DESCRIPTION OF PREFERRED EMBODIMENTS

Figure 1:
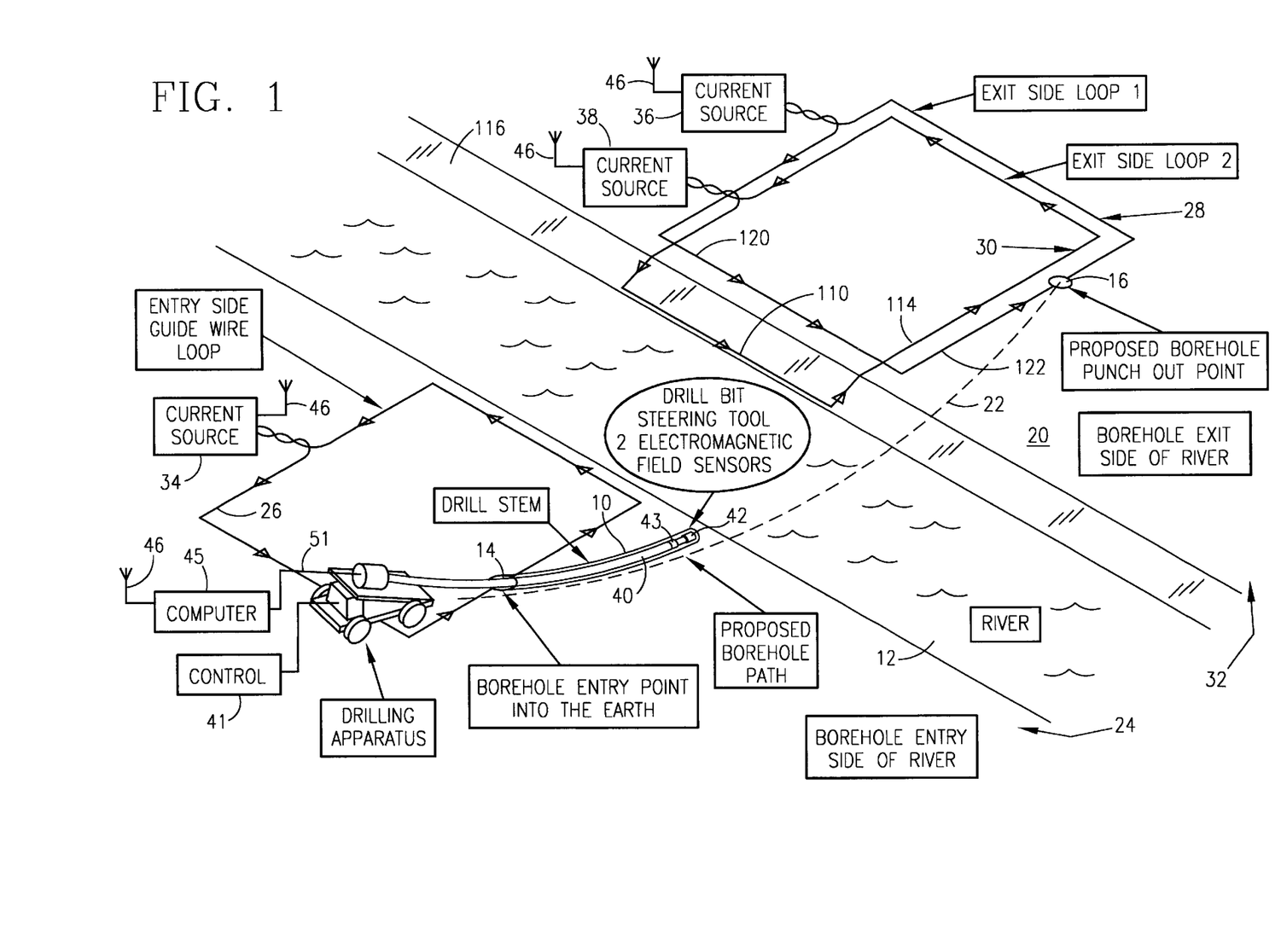
FIG. 1 is a diagrammatic illustration of a borehole survey system for a generally horizontal borehole in accordance with one embodiment of the invention.

Turning now to a more detailed description of the present invention, FIG. 1 illustrates the methods of the present invention in the context of an important application of the invention, where a borehole 10 is to be drilled under an obstacle such as a river 12 as part of a pipeline or transmission cable project. It will be understood, however, that the illustrated embodiment is exemplary, and that the described methods and apparatus can be used in a wide variety of applications. The borehole 10 has a prescribed entry point 14 and a prescribed punch out, or exit, point 16 on the Earth's surface 20 and is to follow a predetermined, planned or "proposal" path 22 between the entry and the exit points. Typically, the entry and exit points 14 and 16 are separated by 1000 meters or more, with the drilling specification calling for the proposal path 22 to be precisely followed laterally, i.e., to within a few meters on either side of the proposal under the land portions of the path.

On the entry side 24 of the river at least one loop 26 of wire is laid out, and either one or two loops 28 and 30 are laid out on the exit side 32 of the river, as shown. The surface elevation, northing and easting coordinates of multiple points specifying the surface loop configurations for each of loops 26, 28 and 30 are determined using standard land surveying techniques. Logical reference points for each of the loops are the specified borehole entry point 14 and exit point 16 locations associated with each. The entry side loop 26 is powered by a source 34 which may be an alternating current (AC) source or may be a direct current (DC) source which can be turned on and off preferably with reversed current flow polarity, to enable separation of the electromagnetic field generated by the loop from the Earth's magnetic field. Similarly, the loop 28 is powered by a current source 36, and the loop 30, if used, is powered by a current source 38. Again, each of the sources 36 and 38 may be alternating current sources or direct current sources which can be turned on and off, preferably with reversed current flow polarity.

The borehole 10 is drilled using drilling apparatus which includes a drill stem 40 of precisely known length, control circuitry 41 at the entry end for controlling the direction of drilling, a drilling bit 42 and an electronic steering tool 43 at the downhole end of the drill stem 40, and conventional apparatus for communicating steering tool measurements to the Earth's surface. Steering tools, which are standard to the drilling industry, normally incorporate three Earth's magnetic field sensors and three accelerometers. Traditionally, the axial gravity or the axial magnetic field vector component sensors are designated as z axis sensors, while those measuring vector components perpendicular to the borehole axis are perpendicular to each other and are designated as x and y sensors. These sensors are used to determine the drilling direction and the roll angle of the "tool face" for changing the direction of drilling.

In accordance with one form of the present invention, an ordinary, unmodified steering tool 43 is employed in conjunction with DC excitation of an entry or exit magnetic field source loop such as loops 26 or 28. This excitation produces a corresponding magnetic field in the Earth in the region of the steering tool, and x, and y, and z electromagnetic field components generated by the loop at a measuring station are found by making two sequential measurements with known positive and negative currents. Usually, currents of approximately 50 amperes in each direction are appropriate. The apparent Earth field values are fractionally weighted by the positive and negative current values, with the sum of these values giving the normally measured Earth field x, y and z components, and the difference of these fields giving the x, y and z electromagnetic components. This method of separating the Earth field and electromagnetic field is simple, well known and straight forward and can be used with any standard steering tool.

Very significant performance improvements, in addition to operational simplification, can be obtained by using a computerized AC method with synchronous detection, which is derived from the principles of an analog lock in amplifier. In this case, the guide wire loop is excited by alternating current of low enough frequency so that the direct current analysis of the electromagnetic phenomena given below is applicable. The electronic apparatus accompanying this method is shown schematically for one of the loops in FIG. 2. As there illustrated, the current source 34 excites loop 26 with 2 amperes at a frequency of 3 Hertz. This source incorporates an analog to digital converter 44 to appropriately sample the amplitude of this current and to telemeter the output to a remotely located computer 45 via a suitable telemetry link 46, as indicated.

Figure 2:
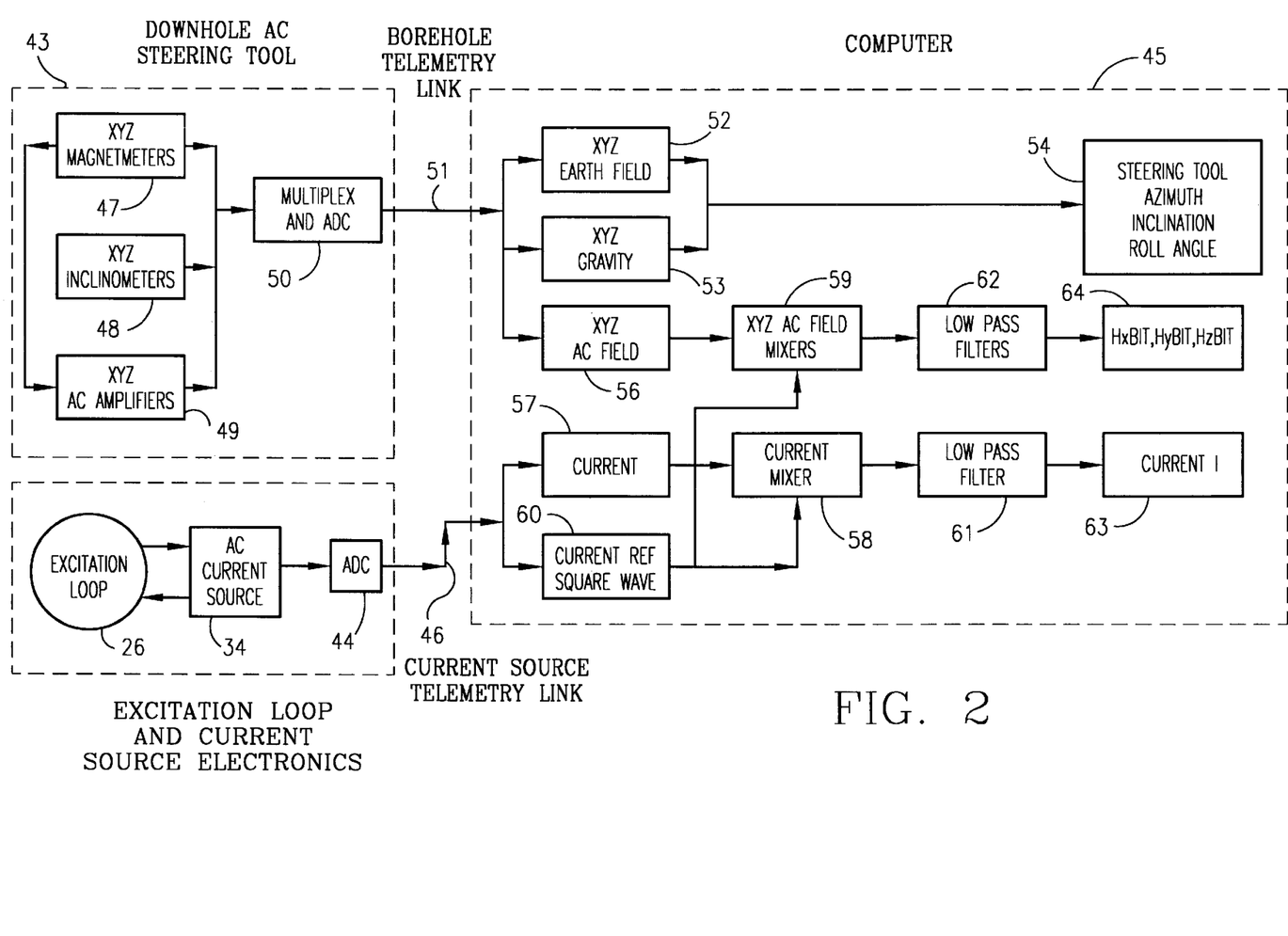
FIG. 2 is a schematic block diagram of electronic circuitry for the system of the invention.

The steering tool 43 is specially constructed for this work. In addition to outputs from digitized Earth magnetic field sensors 47 and gravity sensors 48, three narrow band 3-Hz amplifiers 49 with a gain of 100 are connected to magnetometers 47 and are incorporated in the tool together with appropriate multiplexing and digitizing circuitry 50. The outputs are communicated by a telemetry wire 51 inside the drill bore to the surface computer 45.

The Earth magnetic field and gravity data are analyzed in computer 45 at 52 and 53, with standard steering tools, to provide determinations of the drilling inclination, azimuth and tool roll angle, as indicated at 54.

In computer 45, the AC electromagnetic signals at 56 and current signals at 57 are each multiplied in the mixers 58 and 59 by a reference square wave 60 derived from the AC current signal generated. The reference square wave has amplitude 1 and the same zero crossings and phase as the current signal. The resulting mixed signals are passed through respective low pass filters 61 and 62 to enhance the signal to noise ratio and precision of the measurements. The output of each channel is proportional to direct current signals at 63 and 64 representing, respectively, the current I, and field values Hxbit, Hybit, and Hzbit, i.e., to the appropriate direct current electromagnetic quantities used in the analysis below.

The large, cumulative lateral error which accrues when standard steering tool methods are used, as discussed above, is overcome by the electromagnetic method of the present invention. Whether a steering tool survey method, an electromagnetic location method or just simple, "straight ahead" drilling has been employed prior to the depth at which electromagnetic measurements of the location of the drill bit are to be carried out for use in directional control of further drilling, it will be assumed that the radial away distance to the sensors 47 at the steering tool 43 from the borehole entry point 14 in the ground can be determined from the measured borehole depth of the sensors with sufficient precision to permit accurate calculations of lateral position. Thus, at any measured depth to the electromagnetic sensors a spherical surface with known radius and center is defined.

The desired borehole path 22 is usually specified by a borehole proposal survey tabulation. It lists as a function of the measured depth in the borehole the desired borehole direction and coordinates. At any given measured depth of a borehole being drilled, the parameter of most interest to a driller is the radial, laterally directed, vector between the borehole proposal where the drill bit is supposed to be at the recorded borehole measured depth, and its actual location, in the borehole being drilled. This radial, laterally directed, vector is determined, in accordance with the invention, by comparing measurements of two electromagnetic field vector components with computed values.

Figure 3:
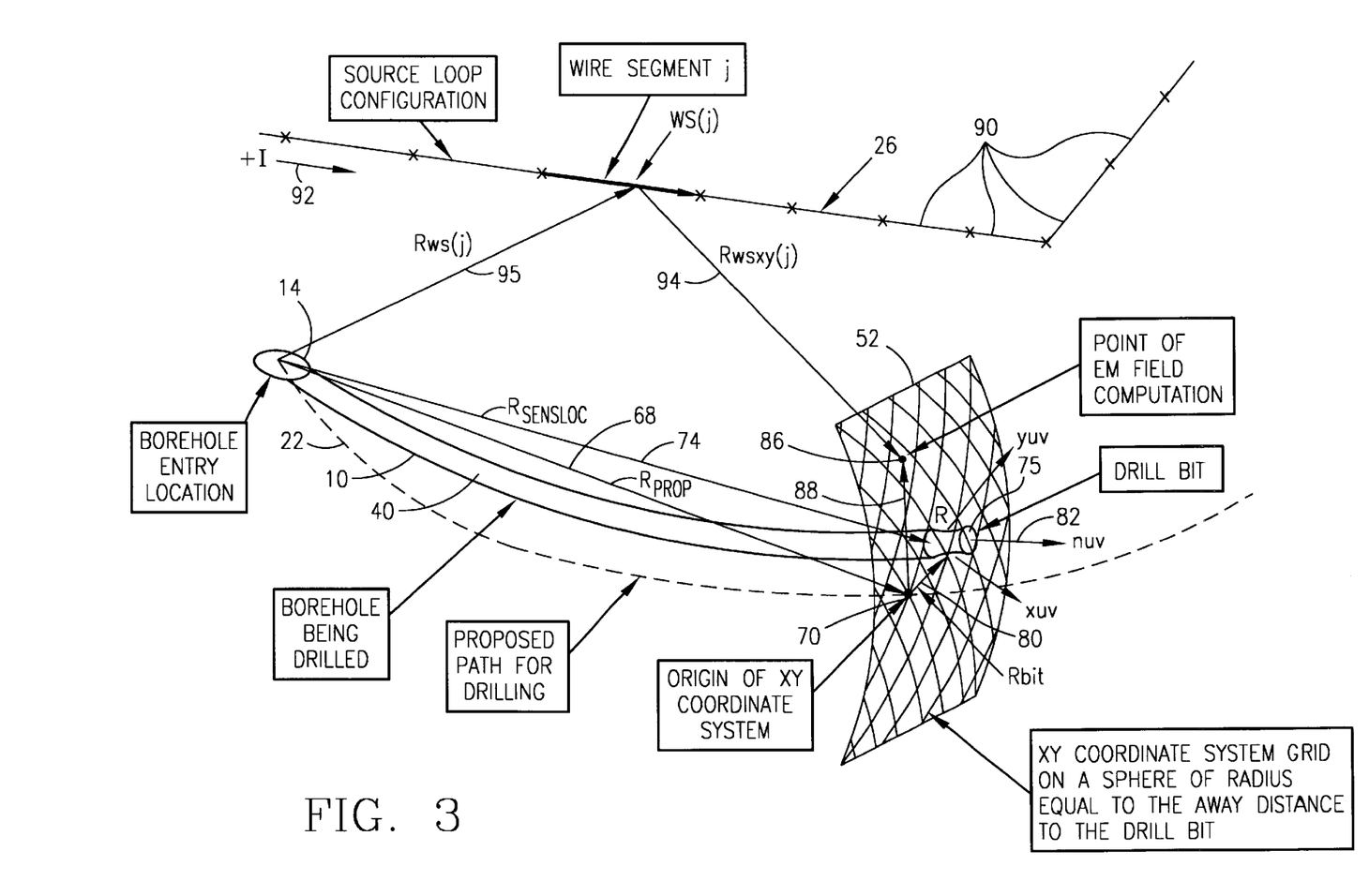
FIG. 3 is a diagrammatic illustration of measurement parameters for determining the location of a drill bit in a borehole being drilled.
Figure 4:
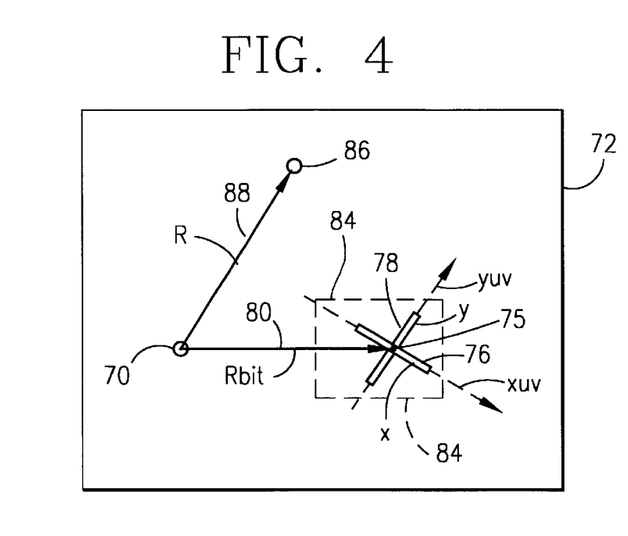
FIG. 4 is an end view of the diagram of FIG. 3.
Figures 5, 8:
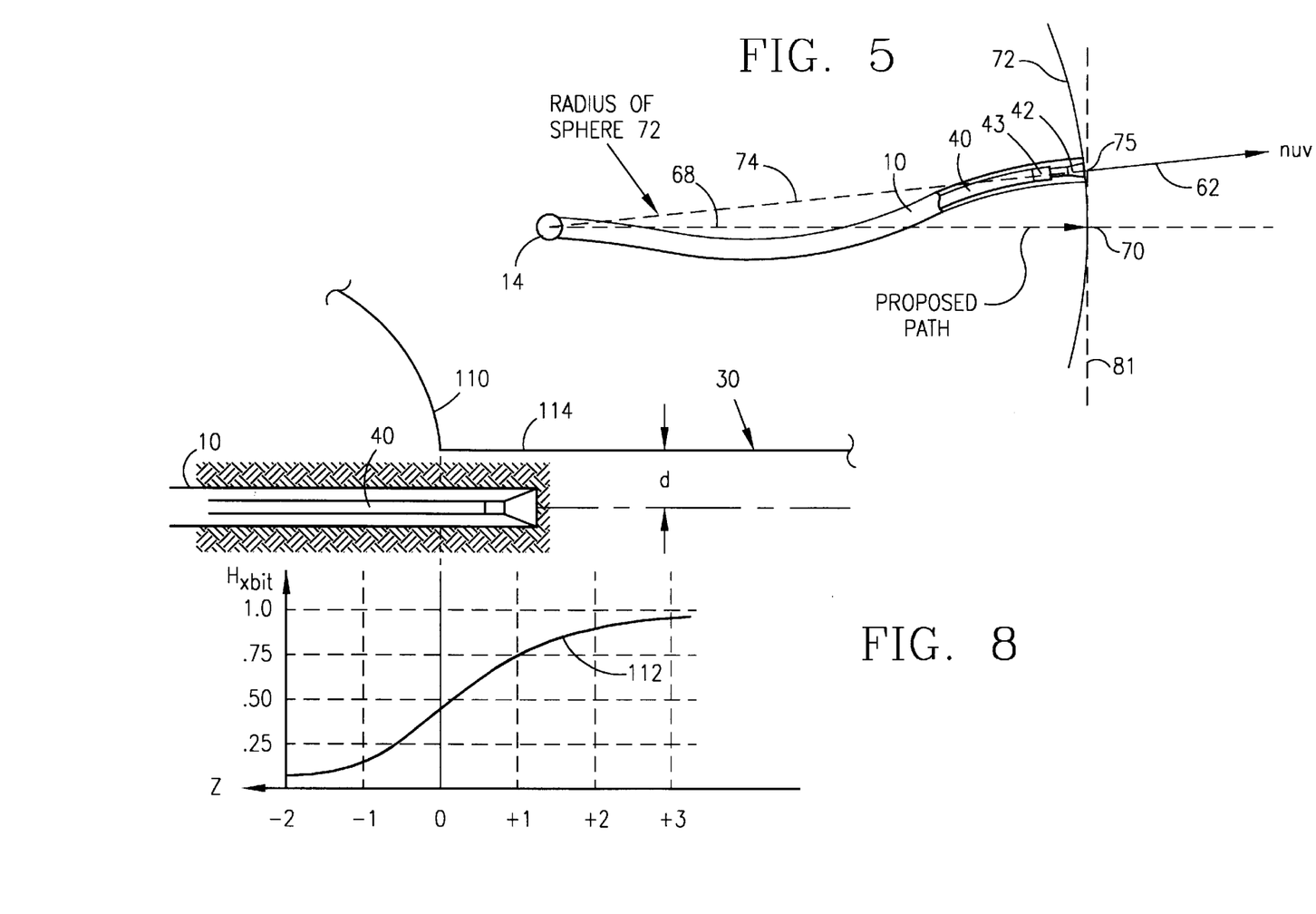
FIG. 5 is a top view of the diagram of FIG. 3.
FIG. 8 illustrates changes in magnetic fields produced by the current loops of FIG. 1.

FIG. 3 is a schematic, perspective view of a measurement system which is useful for depicting and defining quantities used in calculating drill bit location with respect to a surface current loop such as the loop 26 of FIG. 1. FIG. 4 is an end view of the measurement system of FIG. 3, and FIG. 5 is a top plan view, omitting the surface current loop 26 for clarity. The entry point 14 of the borehole into the Earth defines the coordinate origin from which locations are determined. The vector Rsensloc, specifying the location of the x and y electromagnetic field sensors 47 with respect to entry point 14, is given by the vector sum:

$$RSensLoc = Rprop + Rbit \quad (Eq\ 1)$$

Rprop is a vector, indicated at 68, which extends from the entry point 14 to an origin 70 which is at the intersection of the proposal path 22 of the borehole and an imaginary spherical surface 72 which passes through the location of sensors 47. The vector RsensLoc is the radius 74 of surface 72, and is equal to the straight line "away distance" from the entry point 14 to the location 75 of the x and y field sensors 47, illustrated in FIG. 4 as x sensor 76 and y sensor 78, on surface 72. The location of the origin 70 on surface 72 is given by coordinate entries taken from the borehole proposal survey tabulation at a measured depth which is defined by the measured length of the borehole drill stem. Rbit is a vector 80 representing the location of point 75, at the xy sensors 76, 78, from the origin 70. In the following description it will be assumed that Rbit is small compared to the radius of the spherical surface 72 and that the borehole 10 is approximately perpendicular to this spherical surface. Both conditions are almost always satisfied; however, they are not necessary. These conditions lead to the conclusion that the sensors 76 and 78, as well as the vector 80 (Rbit) effectively lie in a plane 81 (FIG. 5) which is tangent to the spherical surface 72 at origin 70, and which plane is approximately perpendicular to the borehole 10. If a proposal survey is unavailable, any other point on this spherical surface in the general environment of the sensors could be conveniently used in this formulation. The important points are that the measured depth of borehole 10 along drill stem 40 effectively defines the location of a spherical surface 72 of known radius (depth) 74, and that x and y component electromagnetic field measurements optimally determine the sensor location on that surface.

The direction of the borehole 10 at sphere 72 is represented by the unit vector nuv, indicated at 82 in FIGS. 3 and 5. This unit vector is measured by conventional orientation sensors, such as inclinometers 48 and Earth magnetic field magnetometers 47 located in steering tool 43 of the drilling assembly. These sensors measure the roll angle and borehole direction of the steering tool, and define the orientation of the unit vectors xuv and yuv (FIG. 4) of the electromagnetic field sensors 74 and 76 on surface 72. The origin 70 defines an xy coordinate system (x=0; y=0) at the point on the spherical surface 72 where Rprop intersects it, as noted above. (FIGS. 1 and 5). The problem of determining the location 75 of the drill bit with respect to the origin 70 is then reduced to determining the value of the vector 80 (Rbit) from the origin to the location 75 of sensors 76 and 78, from the values of xbit and ybit in the vector:

$$Rbit = xbit*xluv + ybit*yluv \quad (Eq\ 2)$$

In the foregoing, the vectors xluv and yluv are location unit vectors, which are projections of the axes xuv and yuv of sensors 76 and 78 onto the spherical surface 72 on which Rbit lies. The unit vectors xuv and xluv, and yuv and yluv, coincide if the quantities xuv and yuv, defined by the sensors, are perpendicular to the borehole 10 and the borehole is perpendicular to a spherical patch 84 on the surface of sphere 72. If the x and y sensors 76 and 78 are not perpendicular to the borehole 10 or the borehole is not perpendicular to the spherical patch 84, the difference between the xluv and yluv unit vectors and the xuv and yuv unit vectors can be significant. The optimum choice for the directions of the electromagnetic sensors 76 and 78 is not only that they be perpendicular to each other but that they also be perpendicular to the axis of borehole 10.

The measured values of the magnetic field vectors Hxbit and Hybit at sensors 76 and 78, respectively, define a two dimensional projection of the vectors of the electromagnetic field Hbit on a plane perpendicular to the borehole 10 at point 75, where the magnetic field is generated by loop 26; for example:

$$Hbit = Hxbit*xuv + Hybit*yuv \quad (Eq\ 3)$$

A three component, theoretical electromagnetic field vector H generated by guide source wires such as loop 26 at an arbitrary location 86 on the xy plane 72 may also be calculated. The location 86 is defined by a vector R, indicated at 88 in FIGS. 2 and 3, and is defined as:

$$R = x*xluv + y*yluv \quad (Eq\ 4)$$

To determine this value, the wire guide source 26 is conveniently defined by breaking it up into an ensemble of short, connected wire segments 90 (FIG. 3) which are numbered by an index j and identified as ws(j). A wire segment file is generated, usually from three dimensional ground surveying data which gives sufficient information to define precisely the location of the entire wire path 26. Sometimes it is necessary to generate the wire segment file from other knowledge, for example if part of the guide wire is inside an existing borehole which is to be used as a reference path over a segment of the drilling path.

The wire survey data are processed mathematically, usually by an interpolation procedure, into an ensemble of data from short, essentially straight wire segments ws(j) each with known location and direction. In this context, "short" wire segments means short enough that the magnetic field generated by each segment at a point 86 defined by R on the surface 72 near the sensors 76, 78 is adequately computed as if each segment ws(j) was infinitesimally short.

The data are calculated for a large number of points on surface 72, to create a wire segment file in which each line has 7 entries. Normally, the first entry is the index j (the identifying number for the wire segment) followed by 3 entries for the vector components of Rws(j) and 3 entries defining the vector components of the corresponding wire segment vector ws(j). The direction sense of each wire segment is taken to be the direction of positive current I through it, indicated by arrow 92 in FIG. 3. Thus, an ensemble of known vectors Rwsxy(j), such as those indicated at 94 in FIG. 3, connecting each of the wire segments 90 to an arbitrary point 86 on the xy plane defined by a vector R from origin 70 can be found. Inspection of FIG. 3 shows that:

$$Rwsxy(j) = Rprop + R - Rws(j) \quad (Eq\ 5)$$

where Rws(j) is the vector (indicated at 95) from the entry point 14 to a wire segment 90.

The electromagnetic field vector H at point 86, is found by computing the field generated by each wire segment and vectorially summing over all j elements. The known law of Biot Savart enables this to be written as:

$$H(R) = (I/(4*pi))*VectorSumOverj(cross(ws(j), Rwsxy(j))/MagRwsxy(j)\hat{}3) \quad (Eq\ 6)$$

$$MagRwsxy(j) = sqrt(dot(Rwsxy(j), Rwsxy(j))) \quad (Eq\ 7)$$

It is noted that "(cross(A,B)" is the three dimensional vector defined by the conventional cross product of the two vectors A and B; dot(A,B) is the scalar quantity defined by the conventional vector dot product of A and B; sqrt designates square root; and ^3 denotes raise to the $3^{rd}$ power.

The computed, or theoretical (th) values of the x and y components of H on the sphere 72; i.e., Hxth and Hyth, which are to be computed and compared (or matched) with the values Hxbit and Hybit measured by sensors 76 and 78, are found by taking the appropriate projections of H(R), as follows:

$$Hxth = dot(xuv, H) \quad (Eq\ 8)$$

$$Hyth = dot(yuv, H) \quad (Eq\ 9)$$

Thus, a systematic procedure amenable to computer programming a subroutine has been described for determining the x and y electromagnetic field components generated by a guide wire source loop such as loop 26 for any point R on the plane 72 near the sensors 76 and 78.

The lateral location of the drill bit at 75 on spherical surface 72 with respect to the origin 70 on the surface is determined as being the location where the measured values Hxbit and Hybit match the values of Hxth and Hyth. The validity of this procedure depends on having a one to one location mapping between the measured and computed field quantities and points on the spherical patch 84 of the surface area of sphere 72. The exact configuration of the guide wire loop 26 used in the determination of these locations involves design considerations of optimization. In general, the wire elements lying closest to the point of measurement on sphere 72 contribute dominantly to the fields measured and must be surveyed most carefully; however, in any loop configuration the field contributions from distant parts of the loop cannot be neglected though less care needs to be exercised in surveying them.

Since the basic method allows for arbitrary source loop configurations various design optimizations are readily incorporated. Often laying out a configuration based on guide wire principles is simpler, since for the present invention only a single wire which lies directly above the drilling path requires careful surveying. Sometimes, however, it is a requirement that the borehole stay within a narrow right of way, or to have the borehole being drilled maintain a fixed separation from another pipe or conduit. In these cases deploying a single wire in an already existing borehole or pipe and incorporating that together with a distant current return path is a great advantage of the system. A single wire guide system, deployed above the drilling path, usually gives best performance for electromagnetically determining drilling azimuth direction.

Figure 6:
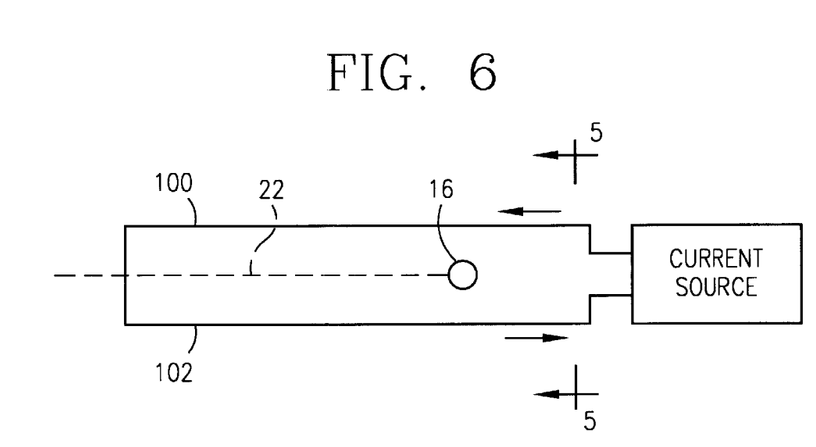
FIG. 6 is a top view of a surface ground loop used in an embodiment of the present invention.

Most wire guide configurations can be related to two idealized cases. The first is a single wire deployed directly above or near the desired borehole path with the wires carrying the "return" current back to the power source being as far away as possible, as illustrated by loop 26 in FIG. 1. In the second case, the loop design is characterized by approximately parallel outgoing and return current wires 100 and 102, with the centerline between them following and lying above the proposed borehole path 22, as illustrated in FIG. 6. Over most of portions of an actual borehole path the measured field components do not differ qualitatively from the idealizations of a long single long wire directly above the proposed path or of a pair of wires above the proposed path carrying current in opposite directions. A double wire system such as that illustrated in FIG. 6 is usually more difficult to deploy; however, it usually requires less land than does a configuration having a remote return loop. The electromagnetic signal change for a given lateral displacement of the sensors in double line systems is usually greater than that of single wire systems.

The electromagnetic field lines alongside a single, long wire are circular and lie in a plane whose surface is perpendicular to the guide wire. The strength of this field varies with the reciprocal of the radial distance to the wire, as given by Ampere's Law. Thus, the reciprocal of the magnitude of the vector sum of the measured field components perpendicular to a borehole following this guide wire is proportional to the distance to the wire. The direction to the guide wire from a point of measurement is perpendicular to the electromagnetic field direction obtained by vectorially combining the measured field components. The absolute direction is obtained by applying the right hand rule of Ampere's law to the measured field direction and the direction of drilling. Thus, guide wire systems dominated by single wire considerations clearly allow determination of lateral location of the sensors with respect to the guide source wire from any point of measurement.

Figure 7:
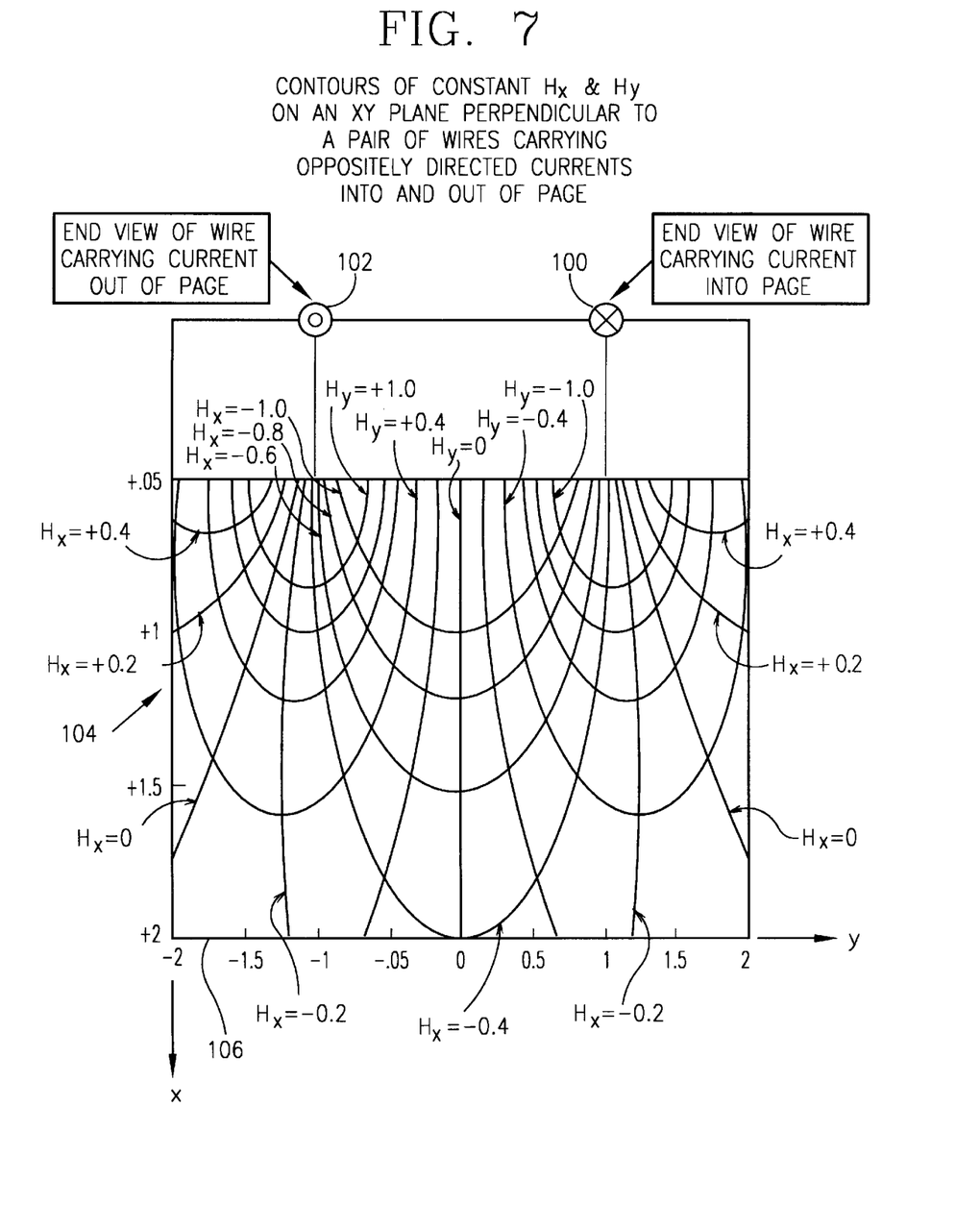
FIG. 7 is a graphical illustration of magnetic fields produced by current flow in the loop of FIG. 6.

In the second class of source loop configuration, illustrated in FIG. 6, two parallel wires 100 and 102 are deployed on the surface to follow the proposed borehole path 22. The outgoing current carrying wire 100 is above and on one side of the proposed path 22, and the return current path 102 is symmetrically placed on the other side of the proposed path. Contour plots of the lines of constant Hx and constant Hy are shown at 104 in FIG. 7 on an xy plane 106 perpendicular to and below the wires. The important point to note is that each location on plane 106 is characterized by a unique pair of Hx and Hy values. Even if the sensors are not oriented along the illustrated x and y axes the principle continues to hold since the direction of the xy coordinates is determined by the orientation of the sensor in the borehole, and measured field components can be mathematically combined and rotated to the illustrated orientation.

Using the guide wire configuration of FIG. 6, the magnetic field values for a multiplicity of points Hxth and Hyth can be computed for the plane 106. The next task is to find the arbitrary point 86 on the imaginary sphere 72, defined by vector R (FIG. 4), for which the computed (or theoretical )values Hxth and Hyth will match the actual measurements Hxbit and Hybit obtained from the sensors 76 and 78 in the borehole. The vector R will be identical to the vector Rbit, both of which originate at point 70 on segment 72, when the measurements match the computed theoretical values.

To proceed with the foregoing computation, it is useful to introduce algebraic matrix notation; the matrix notation of the commercially available Matlab technical programming language is preferred, and will be used herein. Thus, the x and y coordinates which define the point 86 defined by vector R are computed theoretical field values, and the measured xbit and ybit coordinates which define the location 82 of the vector Rbit, where the bit 42 is located, will be written in terms of two component algebraic column vectors xy and xybit, as follows:

$$xy=[x\ y]' \tag{Eq 10}$$

$$xybit=[xbit\ ybit]' \tag{Eq 11}$$

In the Matlab language, [A B] means a row array of the algebraic vector or matrix objects A and B; C' ("C prime") is the transpose of the algebraic vector or matrix C; and the character "*" denotes matrix multiplication.

The measured x and y components of the magnetic field at the drill bit location 75 and the computed values of the x and y field components at a point xy are also written as two component column vectors as:

$$Hbit=[Hxbit\ Hybit]' \tag{Eq 12}$$

$$Hth(xy)=[Hxth(xy)Hyth(xy)]' \tag{Eq 13}$$

To find the location where the measured and computed fields match, any one of a number of equation solving routines can be used. A simple, robust, iterative procedure is based on Newton's one dimensional method. It uses a Taylor series expansion to compute the magnetic field around a point xy by using the derivatives of the theoretical field in the x and y directions. The derivative of Hth with respect to x, may be referred to as dHdx, and the derivative of Hth in the y direction, may be referred to as dHdy. The basic calculus definition of a derivative is conveniently used for numerical computation. With distances measured in meters, the value "delta x=1 centimeter" can be used for computation. Thus, using subroutine functions dHdx(xy) and dHdy(xy), the derivatives at the point xy become:

$$dHdx(xy)=(Hth(xy+[0.01\ 0]')-Hth(xy))/0.01 \tag{Eq. 14}$$

$$dHdy(xy)=(Hth(xy+[0\ 0.01]')-Hth(xy))/0.01 \tag{Eq. 15}$$

Since dHdx and dHdy are each two-element column vectors, it is useful to combine them into a 2 row, 2 column matrix as:

$$dHdxy=[dHdx\ dHdy] \tag{Eq. 16}$$

A Taylor series expansion of the theoretical field Hth in the neighborhood of xy gives an approximate value of the theoretical field at a nearby point with coordinates x=x+dx and y=y+dy, as follows:

$$Hth(xy+dxy)=Hth(xy)+dHdxy(xy)*dxy \tag{Eq. 17}$$

$$dxy=[dx\ dy]' \tag{Eq. 18}$$

The Newton method starts by making an "educated" guess xy0 for xybit. The theoretical magnetic field at this location is then approximated by its Taylor series expansion in the region near xy0; i.e., at points xy0+dxy. The equations are solved for dxy to make Hth(xy0+dxy) so that the computed values match the observation; i.e., Hbit. The resulting value of xy0+dxy is an improved guess for the location of the drill bit (or the drill bit sensors) xybit. Thus:

$$Hxyth(xy0+dxy)=Hxyth(xy0)+dHxydxy(xy0)*dxy=Hbit \tag{Eq. 19}$$

For the case where a borehole has been generally following the proposal path, a good choice for xy0 is [0 0]'. Solving this set of two linear equations with two unknowns for dxy gives:

$$dxy=dHxydxy(xy0)\backslash(Hxybit-Hxyth(xy0)) \tag{Eq. 20}$$

In the Matlab language "\" means left matrix division and the solution to A*x=b is written x=A\b. If A is a square matrix and x is a column vector it simply means solving the set of linear equations defined by A*x=b as above. If A has more rows than columns, the system of linear equations is over determined, so in this case x=A\b denotes the x which gives the smallest value of (A*x−b)'*(A*x−b); i.e., x=A\b is the best least squares error solution to the system of equations A*x=b. This case will be of interest later on in this disclosure.

To find a better value for xybit, xy1 is taken as the next guess in place of xy0 in Eq. 19 as follows:

$$xy1=xy0+dxy \quad \text{(Eq. 21)}$$

This value xy1 is the result of the "first iteration", and is a better value for the bit location than xy0. The procedure is then repeated to provide a second value xy2 for xybit. This is repeated until the "error" Hxybit−Hxyth becomes suitably small. Normally 4 or 5 iterations are more than adequate to produce an accurate value for Rbit. Since Rprop (FIG. 3) is known, the complete specification for the vector RsensLoc 74 from the entry point 14 to the sensor location 75, given by Eq. 1, has been obtained and the lateral spacing between the location of the bit and the location of the proposal path 22 at sphere segment 72 is determined.

In the example of FIG. 1, where there is a discontinuity between the guide wire loop on the entry side of the river and the guide wire loop on the far side, the driller may have a problem with uncertainty in the overall locations of the two loops. If the simplest surveying means have been employed in laying out the field source loops on both sides of the river, which is usually the case, it may not have been possible to precisely determine the width of the river 12 and thus the precise away location of the entire reference loop structure on the exit side 32 of the river. The field source guide wire configuration at the exit side may be a single loop with a remote return such as the loop 26 illustrated for the near side, may be a loop such as that illustrated in FIG. 6, or may be two loops, such as the loops 28 and 30 illustrated in FIG. 1.

The exit side loop (or loops) is optimally surveyed and specified from the "punch out" point; i.e., the location 16 where the borehole 10 is to come to the surface. For the driller to punch out at the precise location specified, a good along-the-borehole distance measurement to that point is required. In order to accomplish this, it is vital that the driller have a positive, precise determination of the actual away distance of the reference loop structure on the exit side of the river, and particularly the distance of the proposed punch out point. The problem of accurately determining these distances is exacerbated by the fact that dead reckoning is normally used to drill while under the river. This is done by precisely establishing the drilling direction when the borehole leaves the river bank on the near side of the river by measuring Earth's field magnetic compass direction by the steering tool.

The problem is overcome by electromagnetically determining the precise distance of the exit side source wire configuration, such as the loop 30, when the steering tool sensors pass below the edge 110 of the loop 30 which may be located at the river's edge, for example, in addition to determining the lateral position of the borehole 10 with respect to the loop. The direction of the punch out point from the borehole entry point 14 into the Earth is usually known; however, the exact direction is not critical since the lateral position of the borehole 10 with respect to the loop configuration will be determined electromagnetically.

When approaching the edge 110 of the wire source configuration on the far side of the river, as shown in FIG. 1, the magnetic field components in the plane perpendicular to the borehole 10 change very rapidly with sensor location along the borehole. For example, if the borehole 10 is at a depth of 20 meters below the Earth's surface and the wire source configuration is a single wire loop such as loop 30 illustrated in FIG. 1, the magnitude of the magnetic field produced by the loop doubles between the sensor being 12 meters outside the loop and being directly under the edge 110 of the source. This magnetic field variation is depicted by the graph 112 in FIG. 8 which shows the field variation directly beneath a single wire 114, which is part of loop 30. Wire 114 extends to the river bank 116 (FIG. 1), where the edge 110 of the loop, which is perpendicular to wire 114, provides a return path along the river bank.

The horizontal field component Hx in the plane perpendicular to the borehole 10 directly below the edge of the river is entirely generated by the single wire 114 above it; the perpendicular return current path 110 along the river bank gives no contribution to this component of the field. To be noted are the rapid change in the field as the end of the wire 114 is approached, and the relatively uniform field once "inside", or under, the guide wire. Qualitatively similar conclusions apply to a parallel, double wire configuration such as the loops 28 and 30.

The rapid field variation near the edge of the loop configuration is used to provide the driller with the precise distance to the borehole punch out point 16 in addition to providing the lateral position of the borehole with respect to the surface wire configuration. This is conveniently formulated by electromagnetically correcting the away distance of the "punch out" point from measurements at two measurement sites using a single wire source loop a single measurement site of the electromagnetic fields generated by a parallel double wire source configuration at the surface.

As discussed above, the schematic diagram of FIG. 1 illustrates a two loop configuration where two loops 28 and 30 are deployed on the surface of the Earth. They are similar to each other, except that loop 30 has its left edge 110 on the river bank 116, whereas the left edge 120 of loop 28 is located away from the river's edge at a distance which can vary, but which preferably is approximately one half the desired vertical depth d of the borehole (FIG. 8). This depth is a good choice for the illustrated system, which is derived from the idealization of having a single guide wire above the design path as described with respect to FIG. 6. When the sensors 76, 78 are directly below the guide wire 114 of loop 30 and the corresponding wire 122 of loop 28, the perpendicular current "return" wires 110 and 120 running along the river bank give no contribution to the horizontal component of the borehole sensor outputs.

Figure 9:
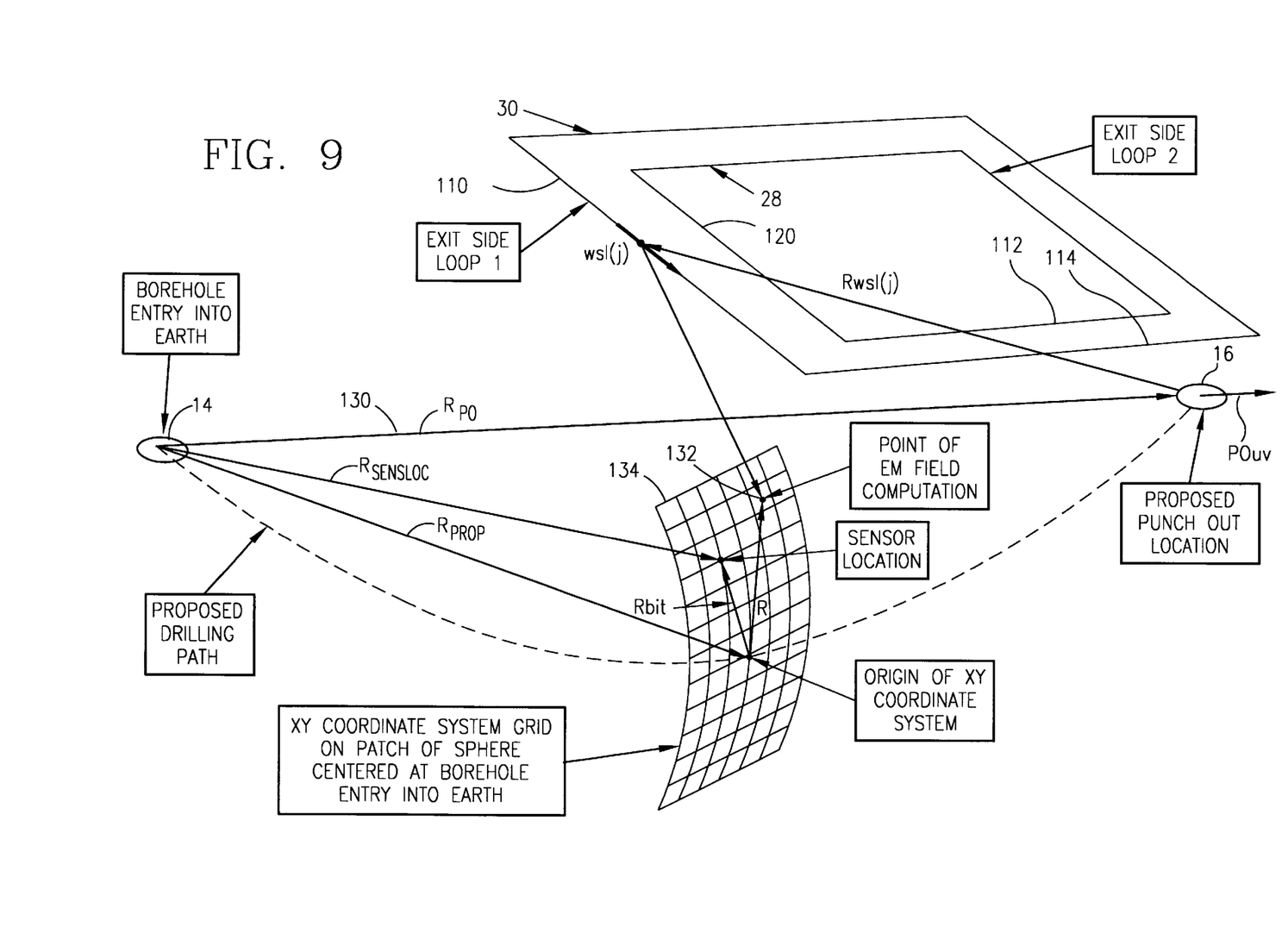
FIG. 9 is a diagrammatic illustration of measurement parameters for the ground loop of FIG. 1.

In this embodiment, illustrated in FIG. 9, two sets of measurements are made at a single location or measurement site. The first measurement is made with loop 30 carrying current I1, to obtain measurement values Hx1bit and Hy1bit, which define a two-element column vector H1xybit. Then current I2 is made to flow in loop 28, yielding measurements Hx2xbit and H2ybit which defines a two-element vector H2xybit, as above. These column vectors are conveniently put "one above the other" to define a four-element column vector H12xybit as:

$$H12bit=[H1xybit; H2xybit] \quad \text{(Eq. 22)}$$

(in Matlab, adding a semicolon into the notation [A B; C D; E F] means that the objects A and B form the first row, C and D the second row, and E and F the third row, etc.) This column vector, together with the measured borehole depth to the sensors, are to be used to determine the location of the sensors and the magnitude of the distance of the punch out point of the proposed borehole path.

As illustrated in FIG. 9, Rpo is the vector 130 from the borehole entry point 14 into the Earth to the punch out point 16, and is conveniently written as the product of the away distance to the punch out point Pod and a unit vector pouv. As shown in this figure, the direction of the punch out point 16, looking from the entry point 14 of the borehole into the ground on the other side of the river, is pouv, thus:

$$Rpo = Pod * pouv \quad \text{(Eq. 23)}$$

where pouv is assumed known and fixed, and Pod is known only approximately and is to be corrected using electromagnetic measurements as described above.

To compute the x and y components of the electromagnetic field at an arbitrary point R located at 132 on a spherical surface 134 (FIG. 9) when coil 30 is excited, the additional punch out distance parameter Pod must be determined. The procedure is the same as above, with the additional parameter Pod as an input parameter in the subroutine function for computing fields. The input parameters for computation can be put into a single column vector xyPod as follows:

$$xyPod = [x\ y\ Pod]' \quad \text{(Eq. 24)}$$

The subroutines which compute x and y components of the field when coil 30 is excited defme at xyPod the two-element column vector H1th(xyPod). The same is true for excitation of coil 28, and similar computation produces a subroutine for a two-element column vector H2th(xyPod). These quantities defme a four-element column vector:

$$H12th(xyPod) = [H1th(xypod);\ H2th(xyPod) \quad \text{(Eq. 25)}$$

As before, the x and y derivatives are computed with an additional derivative with respect to Pod. At xyPod, three 4-element column vectors are defined:

$$dH12dx(xyPod) = (H12th(xyPod) + [0.01\ 0\ 0]') - H12th(xyPod))/0.01 \quad \text{(Eq. 26)}$$

$$dH12dy(xyPod) = (H12th(xyPod + [0\ 0.01\ 0]') - H12th(xyPod))/0.01 \quad \text{(Eq.27)}$$

$$dH12dPod(xyPod) = (H12th(xyPod + [0\ 0\ 0.01]') - H12th(xyPod))/0.01 \quad \text{(Eq. 28)}$$

These derivatives are conveniently combined into a 4-row, 3-column derivative matrix:

$$dH12dxyPod = [dH12dx\ dH12dy\ dH12dPod] \quad \text{(Eq. 29)}$$

The column vector H12th is expanded in a Taylor series in the region around the xypod. It is convenient to introduce the 3 element column vector with differential elements:

$$dxyPod = [dx\ dy\ dPod]' \quad \text{(Eq. 30)}$$

The Taylor expansion written in matrix form reads:

$$H12th(xyPod + dxyPod) = H12th(xyPod) + dH12dxyPod(xyPod) * dxyPod \quad \text{(Eq. 31)}$$

An initial guess for xyPod0 is made and the computed field quantities are equated to the measurements to be matched:

$$H12th(xyPod0) + dH12dxyPod(xyPod0) * dxypod = H12bit \quad \text{(Eq. 32)}$$

Solving for dxyPod, a least squares best fit to the over determined equation set of Eq. 32 is:

$$dxyPod = dH12dxyPod(xyPod0) \backslash (H12bit - H12th(xyPod0) \quad \text{(Eq. 33)}$$

This value of dxyPod optimally fits the data, assuming that the theoretical fields are well described by their Taylor expansion at parameters dxyPod away from xyPod0. This is the case if dxyPod is sufficiently small. In any case, a better approximation of xyPod is xyPod1, where:

$$xyPod1 = xyPod0 + dxyPod \quad \text{(Eq. 34)}$$

Then xyPod1 is used as a starting guess in place of xyPod0 in Eq. 32, to get a better value for xyPod which would be called xyPod2. After iterating this several times a column vector xyPod is found where H12th precisely matches the measured data; i.e., H12bit, at the sensors in the borehole.

The foregoing method can also be used to correct the punch out distance Pod by fitting electromagnetic field measurements at two neighboring locations in the borehole 10, using a single source loop 30 on the exit side of the river. The identical logic and equation structure used above is applied. Four measurements are obtained, two at each location, to defme a four-element column vector. They are compared to a four-element column vector of the theoretical values of the field components computed from the single loop excitation at the two known measured depths where the measurements were made. A straight line projection of the borehole between the closely spaced measuring sites is used to relate the lateral positions at the two borehole measuring sites. As above, the appropriate derivatives are evaluated, put into a Taylor series description of the fields and the over determined, linear set of equations are solved and iterated to match the electromagnetic measurements and computed values.

It is to be noted that data from any number of neighboring borehole depths can be used in these determinations. The only change is in that the number of elements in the column data vector and in the corresponding computed field column vector increases. The number of parameters to be determined, i.e., the three elements of the xyPod column vector stays the same. In principle, better precision can thereby be achieved, since a least squares fit to more input measurements is utilized. The same least square fitting of multiple depths can be done to improve the xy determinations when Pod determination is not an issue.

To determine the azimuthal direction of the borehole, a similar Newton method as was used to fit the location of the borehole is applicable, using all three vector component electromagnetic field measurement data at a station for inputs and the xy and azimuth correction as unknowns. If the dominant electromagnetic field vector is not close to perpendicular to the borehole that is the best way; if it is close to perpendicular the procedure below has conceptual advantages. In this case the location parameters and the azimuth parameters are independent of each other and the determinations of location and azimuth can be done independently of one another.

The computed values Hxth and Hyth in Eq. 8 and Eq. 9 are the projections of the computed field on the unit vectors xuv and yuv generated by the steering tool. In the same spirit Hzth is the z component expected, zuv is the unit vector along the direction of drilling reported by the steering tool.

$$Hzth = dot(zuv, H) \quad \text{(Eq. 35)}$$

The inclination component of zuv is assumed to be correct, since it is derived from the tool inclinometers; however, the azimuthal part derived from the Earth magnetic field magnetometers, i.e., Azapparent, is to be corrected. The difference between Hzbit and Hzth, which we will call the residual error Hzres, is to be ascribed to the azimuthal heading error.

$$Hzres = Hzbit - Hzth \quad \text{(Eq. 36)}$$

The azimuthal heading error is small; in radians it is simply the ratio of Hzres and the horizontal component of the electromagnetic field. Looking downhole, a unit vector is defined which is horizontal and pointing to right side as rsuv. If guv is the gravity direction unit vector:

$$Rsuv = cross(guv, zuv)/sqrt(dot(cross(guv,zuv),cross(guv,zuv))) \quad \text{(Eq. 37)}$$

The right side component of the electromagnetic field Hrsth is readily computed using the theoretical value H (Eq. 6) evaluated at the previously found location of the drill bit determined by matching the measured electromagnetic field components Hxbit and Hybit to computed values, thus $$Hrsth = dot(rsuv, H) \quad \text{Eq 38}$$

Evaluating the Azimuthal error correction AzCorr in radians gives:

$$AzCorr = Hzres/Hrsth \quad \text{(Eq. 39)}$$

(Aztrue=Azapparent+AzCorr, positive Azimuth is clockwise looking vertically down.

In summary, the system of the invention is used to obtain the location of a horizontal borehole, for example during the drilling of such a borehole from an entry point to a remote exit point, with the location measurements being usable to direct further drilling. In accordance with the system, a driller uses a conventional drill assembly, including a steering tool having the usual complement of magnetometers and inclinometers. In one form of the invention, the steering tool is modified to provide amplifiers for the magnetometer outputs.

The borehole is drilled using a steering tool, and every 10 meters, when drilling stops to attach a new section of the drill stem, the depth of the borehole is determined, and the steering tool is operated to measure the current azimuth, inclination, and roll angle of the tool. The measured values are used to extend the borehole coordinates an additional 10 meters, as is conventional in borehole surveys.

In order to determine the location of the borehole (at the sensors in the steering tool) with respect to the planned, or proposal, path of the borehole, the radius of an imaginary sphere which passes through the steering tool is determined by calculating the square root of the elevation $^2$+ northing $^2$+ easting $^2$. This radius has its origin at the entry point of the borehole. In some cases, it may be possible to make the required location calculation with only the measured borehole depth, but it is preferred to utilize the other steering tool measurements, as well.

A unit vector nuv is defined by the direction of the steering tool at the time of the measurement. This vector is not necessarily perpendicular to the surface of the sphere where the sphere intersects the steering tool; in fact, it probably will not be perpendicular, since the borehole drilling direction usually is not perfectly on course, and often the borehole is curved by design. As a result, the unit vectors xuv and yuv of the x and y direction magnetometers, which are the x and y sensors perpendicular to the axis of the steering tool, will not be tangent to the surface of the sphere. Usually, however, the x and y sensors will be nearly tangent if the drilling path has not changed direction very much since the entry point. A coordinate plane for the sensors is defined on the surface of the sphere by projecting the unit vectors, thus providing sensor vectors xluv and yluv on that surface.

The proposed path for the borehole is defined by a survey tabulation. This is a six column table including measured depth, inclination, azimuth, elevation, northing, and easting.

If the drilling has followed the proposal approximately, the calculated depth of the proposal and the measured depth of the borehole will be very close, and may be assumed to coincide. The elevation, northing and easting coordinates of the proposal, at the measured depth, are the coordinates of the point where the proposal intersects the spherical surface. This point defines the vector Rprop (which originates at the entry point), and defines the origin of an xy coordinate system on the spherical surface. Rprop is perpendicular to the spherical surface, although in general neither the proposed direction of drilling nor the actual direction of drilling at this measured depth will be perpendicular to the spherical surface.

The difference between the location of the borehole sensors (or the drill bit) and the location of origin of the xy coordinate system of the sphere (determined by the proposed path) is obtained by matching measured and computed magnetic field values on the surface of the sphere. This is done by selecting an arbitrary point xy (vector R) on the surface and computing the three component vector H for that point. Comparison of the field components measured by the sensor with the computed value for point R is done by projecting the computed value of H on the orientation of the sensor vectors xuv and yuv reported by the steering tool. These sensor vectors are obtained from the apparent azimuth, inclination and roll angle measurements from the steering tool.

The matching calculations are done iteratively until the calculated value for the field at R matches the measured value at the sensors, thereby providing the lateral vector from the xy origin, defined by the proposed path, to the actual location of the borehole sensors.

If the spherical surface is not perpendicular to the direction of drilling, the computed (theoretical) values of Hxth and Hyth (which are projections of H on xuv and yuv) will be the correct values to compare with the measured values. If the measured borehole direction is incorrect, and xuv and yuv are therefore slightly in error, the resulting error in the projection of the computed value of H will be small, because H is close to being perpendicular to xuv and yuv.

It is noted that any error in the direction of the borehole (as opposed to errors in lateral placement) leads to a relatively large change in the measured z (axial) component of the magnetic field, since that component is proportional to the sine of the angles. In this case, the measured value of Hzbit and the computed value of Hzth will differ substantially, and can be used to measure the error in the direction of drilling. If H is dominantly in the horizontal direction, as is the case with a single guide wire source, then Hzbit is dominated by the error in the azimuthal direction of drilling.

Although the present invention has been described in terms of preferred embodiments, it will be understood that numerous modifications and variations will be apparent to those of skill in the art without departing from the true spirit and scope of the invention, as set forth in the following claims.

What is claimed is:

1. A method for surveying a borehole comprising the steps of:

generating an electromagnetic field in the region of the borehole by means of electric current flowing through a loop wire having a known configuration and location connected to a power source of electric current;

measuring first and second vector components of said electromagnetic field at respective first and second sensors located at a measuring point in said borehole, said vector components each being substantially perpendicular to the axis of the borehole;

determining a radial away distance to said measuring point from a first known location;

computing theoretical first and second electromagnetic field vector components only, for said generated electromagnetic field at multiple locations of said first and second sensors at said radial away distance; and determining the location of said sensors by finding the location where the values of said measured first and second electromagnetic field vector components equal the values of computed theoretical first and second electromagnetic field vector components.

2. The method of claim 1, wherein measuring said first and second vector components comprises measuring components of said generated electromagnetic field which are perpendicular to said borehole.

3. The method of claim 1, wherein determining a radial away distance includes measuring the along-the-borehole depth of said sensors at said measuring point in the borehole.

4. The method of claim 1, wherein measuring said first and second vector components comprises determining the orientation of said first and second sensors in said borehole; and measuring components of said generated electromagnetic field which are perpendicular to each other and the axis of the borehole.

5. The method of claim 1, wherein generating an electromagnetic field includes directing a. reversible direct current of known amplitude through said loop.

6. The method of claim 1, wherein generating an electromagnetic field includes directing an alternating current of known amplitude and frequency through said loop.

7. Apparatus for borehole surveys comprising:

a downhole tool located in a borehole in the earth, said tool having an axis and including a measurement circuit having first and second magnetometers in an x-y plane substantially perpendicular to said axis, and first, second and third mutually perpendicular inclinometers;

means for determining the radial away distance of said tool;

an electromagnetic excitation system including at least one electrical conductor at a known location and carrying an electrical current producing an electromagnetic field in the region of said first and second magnetometers;

computing circuitry;

a telemetry link for transmitting measurement signals from said first and second magnetometers and from said first, second and third inclinometers to said computing circuitry;

circuitry in said computing circuitry responsive to said measurement signals from said inclinations for determining the roll angle of said tool and responsive to said measurement signals from said first and second magnetometer for determining only the x-y vector components of said electromagnetic field at said tool; and means for determining from said away distance, said roll angle, said vector components, and said electrical current in said conductor the lateral location of said tool with respect to said conductor.

8. The apparatus of claim 7, wherein said first and second magnetometers are at substantially right angles to each other in said x-y plane.

9. The apparatus of claim 7, wherein said downhole tool is a surveying tool.

10. The apparatus of claim 7, wherein said downhole tool is a steering tool.

11. The apparatus of claim 7, wherein said electrical current is an alternating current.

12. The apparatus of claim 7, wherein said tool is a steering tool, and said electrical conductor lies on the earth's surface to define a proposed path for said borehole.

13. The apparatus of claim 12, wherein said means for determining the lateral location of said tool with respect to said conductor also determines the lateral location of said tool with respect to said proposed path.

14. The apparatus of claim 7, further including a third magnetometer for measuring a component of said electromagnetic field which is substantially parallel to said axis of said tool for determining the relative azimuthal direction of the borehole.

15. The apparatus of claim 7, wherein said excitation system includes first and second electrical loop conductors carrying first and second electrical currents respectively, said currents producing corresponding first and second electromagnetic fields in the region of at least a part of said borehole.

16. The apparatus of claim 15, further including means responsive to said first and second electromagnetic fields for measuring the distance along a proposed borehole path from said tool to said first and second loop conductors.

17. The apparatus of claim 16, wherein said tool is a steering tool for drilling said borehole along a proposed path defined by said first and second loop conductors.

18. The apparatus of claim 17, wherein said first and second loop conductors define an exit point for said borehole.

19. The apparatus of claim 15, wherein said first and second currents are alternating currents.

20. The apparatus of claim 15, wherein said first and second currents are variable direct currents.

21. The apparatus of claim 7, wherein said electrical current is a direct current.

22. The apparatus of claim 7, further including means for determining the distance along said borehole from said downhole tool to said computing circuitry location, whereby the location of said downhole tool with respect to said excitation system is determinable.

23. A method for determining the location of a downhole tool movable in a subsurface borehole, comprising:

measuring at a plurality of tool depths incremental distances along the borehole to obtain plural measured along-the-borehole depths of the tool;

positioning an excitation system including at least one electrical conductor on the earth's surface at a known location along at least a part of a proposed path of the borehole;

generating a known current flow in said conductor to produce a known electromagnetic field in the region of at least a portion of the borehole;

measuring at each of said plurality of tool depths, only two vector components of said electromagnetic field which are substantially perpendicular to each other and to the axis of said tool;

measuring at each of said plurality of tool depths the roll angle of said tool;

determining the orientation of said measured vector components; and determining from each of said plural measurements the corresponding location of said tool relative to said excitation system.

24. The method of claim 23, wherein determining the location of said tool includes computing the magnetic field vector components at selected multiple locations in the region of said excitation system; and comparing said computed vector components with said measured vector components.

25. The method of claim 23, further including:

establishing a proposed path for said borehole from said entrance point to an exit point;

drilling said borehole; and periodically determining the location of said tool relative to said excitation system and thereby determining the location of said tool relative to said proposed path.

26. The method of claim 23, further including measuring, at said tool, a component of said electromagnetic field parallel to the axis of said tool; and determining therefrom a component of tool direction relative to said excitation system.

27. The method of claim 23, wherein determining the location of said tool comprises determining the lateral and the radial away locations of the tool.

28. The method of claim 27, wherein determining the location of said tool includes computing the values of magnetic field components at selected multiple locations in the region of said excitation system; and comparing by mathematical iteration, said computed values with said measured two vector components to obtain a lateral location at which measured fields match computed values.

29. The method of claim 23, wherein determining the location of said tool includes;

determining the away distance of a single conductor excitation system from said tool by measuring said electromagnetic field components at two or more locations along the borehole.

30. A method for determining the location of a downhole tool moveable in a subsurface borehole, comprising:

positioning an excitation system including first and second electrically conductive loops on the earth's surface at a known location, the loops extending along at least a part of a proposed borehole path;

directing first and second electrical currents of known amplitude and direction through said first and second loops for generating corresponding first and second electromagnetic fields in the region of said at least a part of proposed borehole path;

positioning in said borehole a downhole tool including magnetometers and inclinometers;

measuring at said tool for each of said first and second electromagnetic fields two vector components which are substantially mutually perpendicular to each other and to the longitudinal axis of said borehole at the tool location;

measuring at said tool the roll angle of the tool in said borehole; and determining from said measurements the away distance of said excitation system from said tool and the lateral location of said tool with respect to the excitation system.

31. A method for determining the location of a downhole tool moveable in a subsurface borehole, comprising:

positioning an excitation system including first and second electrically conductive loops on the earth's surface in the region of a location on a proposed borehole path toward which the borehole is directed;

directing first and second electrical currents of known amplitude and direction through said first and second loops for generating corresponding first and second electromagnetic fields in the region of at least a portion of said proposed borehole path;

positioning in said borehole a downhole tool including magnetometers and inclinometers;

measuring at a plurality of tool positions along said borehole first and second vector components of each of the electromagnetic fields generated by said first and second currents, said vector components being substantially perpendicular to each other and to the longitudinal axis of said borehole;

measuring the tool roll angle at each of said plurality of tool positions; and determining from said measurements the away distance from said borehole tool to said loops.

32. The method of claim 31, wherein determining the away distance includes computing theoretical first and second electromagnetic field vector components for multiple locations of said tool with respect to said loops for said downhole tool for each of said first and second loops; and comparing said theoretical field vector components with said measured field vector components.

* * * * *